US007586633B2

(12) United States Patent
Urabe

(10) Patent No.: US 7,586,633 B2
(45) Date of Patent: Sep. 8, 2009

(54) IMAGE PROCESSING APPARATUS, AND METHOD OF AND SYSTEM FOR MANAGING IMAGE PROCESSING APPARATUS

(75) Inventor: Akio Urabe, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 983 days.

(21) Appl. No.: 10/803,938

(22) Filed: Mar. 19, 2004

(65) Prior Publication Data

US 2004/0184066 A1 Sep. 23, 2004

(30) Foreign Application Priority Data

Mar. 19, 2003 (JP) ............................ 2003-076485

(51) Int. Cl.
*G06F 15/00* (2006.01)

(52) U.S. Cl. ..................... 358/1.15; 358/1.14; 358/435; 358/436; 358/437; 709/218; 709/203; 709/224; 709/225

(58) Field of Classification Search ................ 358/1.14, 358/1.15, 435–439, 442; 709/217–219, 203, 709/223–226; 399/24–27, 10, 12; 705/1, 705/14

See application file for complete search history.

(56) References Cited

U.S. PATENT DOCUMENTS

| | | | |
|---|---|---|---|
| 5,353,359 A | 10/1994 | Urabe et al. | |
| RE34,842 E | 1/1995 | Ejiri et al. | |
| 5,412,779 A | 5/1995 | Motoyama | |
| 5,537,554 A | 7/1996 | Motoyama | |
| 5,544,289 A | 8/1996 | Motoyama | |
| 5,774,678 A | 6/1998 | Motoyama | |
| 5,887,216 A | 3/1999 | Motoyama | |
| 5,909,493 A | 6/1999 | Motoyama | |
| 5,974,472 A | 10/1999 | Urabe | |
| 6,182,159 B1 | 1/2001 | Urabe | |
| 6,628,413 B1 * | 9/2003 | Lee | 358/1.15 |
| 6,785,023 B1 * | 8/2004 | Iida | 358/442 |
| 6,859,832 B1 * | 2/2005 | Gecht et al. | 709/224 |
| 7,043,523 B2 * | 5/2006 | Haines et al. | 709/203 |
| 7,061,391 B2 * | 6/2006 | Hopper et al. | 340/691.1 |
| 7,149,697 B2 * | 12/2006 | Zerza et al. | 705/1 |
| 2002/0067504 A1 * | 6/2002 | Salgado et al. | 358/1.15 |

(Continued)

FOREIGN PATENT DOCUMENTS

| | | |
|---|---|---|
| JP | 5-244327 | 9/1993 |
| JP | 6-178026 | 6/1994 |
| JP | 6-237330 | 8/1994 |
| JP | 8-195849 | 7/1996 |
| JP | 2000-101771 | 4/2000 |
| JP | 2000-172597 | 6/2000 |
| JP | 3170515 | 3/2001 |
| JP | 2001-154953 | 6/2001 |
| JP | 2003-50882 | 2/2003 |

*Primary Examiner*—Chan S Park
(74) *Attorney, Agent, or Firm*—Oblon, Spivak, McClelland, Maier & Neustadt, P.C.

(57) ABSTRACT

A managing apparatus connected to a computer network manages an image processing apparatus via the computer network. The image processing apparatus is connected to the computer network via a firewall that allows data transmitted using predetermined protocols to pass through, and at least one of the predetermined protocols has an immediacy. A report generation/transmission unit provided in the image processing apparatus generates and transmits a report data to the managing apparatus through the computer network, using the protocol having the immediacy. The managing apparatus outputs contents of the report data received, and sends a reply data in response to the report data, to the image processing apparatus through the computer network using the protocol having the immediacy.

19 Claims, 10 Drawing Sheets

U.S. PATENT DOCUMENTS

2002/0136559 A1* 9/2002 Simpson et al. ................ 399/9
2003/0032421 A1 2/2003 Izumi et al.
2003/0065773 A1* 4/2003 Aiba et al. .................. 709/224
2004/0100651 A1* 5/2004 Leone et al. ............... 358/1.15
2004/0139183 A1* 7/2004 Motoyama et al. .......... 709/223
2004/0215785 A1* 10/2004 Shima ........................ 709/227

* cited by examiner

FIG.5

```
GET /cgi-bin/cgi.remoteservice?U=123456&P=341    HTTP/1.0
```

FIG.6

```
HTTP/1.0 200 Document follows
MIME-Version: 1.0
Server: CERN/3.0
Date: Saturday, 29-Jul-2002 14:16:02 GMT
Content-Type: text/html
Content-Length: 99

<TITLE> REMOTE SERVICE Ver 0.1</TITLE>
        <H1>RECEPTION NUMBER   789012 </H1>
        <H1>TONER END</H1>
```

FIG.7

```
GET /cgi-bin/cgi.remoteservice?U=123456&P=531    HTTP/1.0
```

FIG.8

```
HTTP/1.0 200 Document follows
MIME-Version: 1.0
Server: CERN/3.0
Date: Saturday, 30-Jul-2002 17:20:50 GMT
Content-Type: text/html
Content-Length: 99

<TITLE> REMOTE SERVICE Ver 0.1</TITLE>
        <H1>RECEPTION NUMBER    798537</H1>
        <H1>TONER BOTTLE SHOULD BE REPLACED</H1>
```

FIG.9

```
GET /cgi-bin/cgi.remoteservice?U=123456&P=784    HTTP/1.0
```

FIG.10

```
HTTP/1.0 200 Document follows
MIME-Version: 1.0
Server: CERN/3.0
Date: Saturday, 01-Aug-2002 11:25:35 GMT
Content-Type: text/html
Content-Length: 99

<TITLE> REMOTE SERVICE Ver 0.1</TITLE>
        <H1>RECEPTION NUMBER    897321</H1>
        <H1>ABNORMAL CONDITION IN FIXING DRUM</H1>
```

FIG. 11

```
GET /cgi-bin/cgi.remoteservice?U=123456&T=MANY SCUMMINGS    HTTP/1.0
```

FIG. 12

```
HTTP/1.0 200 Document follows
MIME-Version: 1.0
Server: CERN/3.0
Date: Saturday, 02-Aug-2002 13:37:41 GMT
Content-Type: text/html
Content-Length: 99

<TITLE> REMOTE SERVICE Ver 0.1</TITLE>
        <H1>RECEPTION NUMBER    957649</H1>
        <H1>MANY SCUMMINGS</H1>
```

FIG.13

```
GET /cgi-bin/cgi.remoteservice?U=123456&E=Type2&U=2   HTTP/1.0
```

FIG.14

```
HTTP/1.0 200 Document follows
MIME-Version: 1.0
Server: CERN/3.0
Date: Saturday, 02-Aug-2002 15:37:41 GMT
Content-Type: text/html
Content-Length: 99

<TITLE> REMOTE SERVICE Ver 0.1</TITLE>
        <H1>RECEPTION NUMBER   98642</H1>
        <H1>TYPE2 TWO BOTTLES OF TONER</H1>
```

FIG.15

GET /cgi-bin/cgi.checkupdate?U=123456 HTTP/1.0

FIG.16

HTTP/1.0 200 Document follows
MIME-Version: 1.0
Server: CERN/3.0
Date: Saturday, 02-Aug-2002 15:37:41 GMT
Content-Type: Multipart/Mixed; boundary-"---Next Part-----"

---Next Part-----
Content-Type: text/html
Content-Length: 99

<TITLE> REMOTE SERVICE Ver 0.1</TITLE>
<H1>RECEPTION NUMBER 1256894</H1>
<H1>CONTROLLER UPDATE</H1>
---Next Part-----
Content-Type: Application/Code
Content-Transfer-Encoding: base64
Content-Description: MFP Controller Program Ver 3.11
Content-Disposition: attachment; filename="setup311"

300
LS0tIGRyYWZ0LXlhbWFtb3RvLWNoYXJzZXQtaXNvLTIwMjItanA
tMDAudHh0
IE5vdiAgNyAwNTo1NDoxMyAxOTk3CisrKyBkcmFmdC15YW1hb
W90by1jaGFy
MDIyLWpwLTAwLnR4dAIGcmkgTm92ICA3IDEwOjAwOjIwIDE5O
TcKQEAgLTU2

---Next_Part---

FIG. 17

```
GET /cgi-bin/cgi.remoteservice?U=123456&TC=46456&BC=34842&CC=11614
  HTTP/1.0
```

FIG. 18

```
HTTP/1.0 200 Document follows
MIME-Version: 1.0
Server: CERN/3.0
Date: Saturday, 02-Aug-2002 15:37:41 GMT
Content-Type: text/html
Content-Length: 99

<TITLE> REMOTE SERVICE Ver 0.1</TITLE>
        <H1>RECEPTION NUMBER   98631</H1>
        <H1>TOTAL NUMBER OF IMAGES OUTPUT 46456
            NUMBER OF MONOCHROME IMAGES OUTPUT 34842
            NUMBER OF COLOR IMAGES OUTPUT 11614</H1>
```

IMAGE PROCESSING APPARATUS, AND METHOD OF AND SYSTEM FOR MANAGING IMAGE PROCESSING APPARATUS

CROSS-REFERENCE TO RELATED APPLICATIONS

The present document incorporates by reference the entire contents of Japanese priority document, 2003-076485 filed in Japan on Mar. 19, 2003.

BACKGROUND OF THE INVENTION

1) Field of the Invention

The present invention relates to a technique in which a managing apparatus manages an image processing apparatus, such as a copier, a scanner, a printer, a facsimile machine, or a multifunction peripheral, through a computer network.

2) Description of the Related Art

Image processing apparatuses such as copiers, scanners, printers, facsimile machines and multifunction peripherals, which execute more than one of these functions, include consumable products such as a photosensitive drum and toner. The consumable products are the products that need to be replaced when they are exhausted.

The copiers and the printers include a mechanism that feeds sheets of paper on which the image is to be printed. Such a paper feeding mechanism has a large number of rollers, and is complicated. There is a possibility that sheets are jammed between rollers, and hence, periodical maintenance is necessary.

Normally, when sheets are jammed and to fix the problem is out of the user's hands, a service call is made. The user explains details of the problem by telephone and requests a dispatch of the serviceman. Such a procedure can be troublesome and time-consuming.

A performance charge system is often used in some offices to charge customers for the number of copies made by a copier. In this system, a person-in-charge must either check an output counter of the copier, or request the user to inform of a value of the output counter. Such procedure is troublesome, both for the person-in-charge and for the user, and increases service costs.

Thereupon, various systems have been proposed for managing conditions of an image processing apparatus such as the copier and the facsimile machine at a remote location. For example, the following systems have been proposed.

(1) A system in which an analysis apparatus connected to an image processing apparatus through dialup lines, analyzes and fixes a problem concerning a function of the image processing apparatus is proposed in Re-issued U.S. Pat. No. 34,842, U.S. Pat. No. 5,412,779, U.S. Pat. No. 5,537,554, U.S. Pat. No. 5,544,289, U.S. Pat. No. 5,774,678, and Japanese Patent Application Laid-open No. H6-237330. However, in order to introduce such a system, a new telephone line for managing the image processing apparatus must be added, thereby increasing setup cost in some cases. Thus, this system has not become popular.

(2) A system for remote controlling a copier having a facsimile function through dialup lines is proposed in Japanese Patent Application Laid-open No. H5-244327 and Japanese Patent Application Laid-open No. H6-178026. This system has a merit that since the telephone line originally included in the facsimile machine is used, it is unnecessary to add another telephone line when the system is introduced. However, this system cannot be applied to a copier, a printer and the like, which do not have the facsimile function. Further, while data for managing the image formation apparatus is transmitted over the telephone line, the original functions of the facsimile machine such as sending and receiving facsimile messages cannot be used.

(3) A system in which a special-purpose information collecting apparatus for collectively managing one or more image formation apparatuses connected to local area network (LAN) is proposed in U.S. Pat. No. 5,887,216. The information collecting apparatus sends and receives management information or the like to and from a managing apparatus at a remote location. In this system, even if the number of image formation apparatuses connected to the LAN increases, it is unnecessary to increase the telephone line. However, if the number of image formation apparatuses increases, it is necessary to install an additional special-purpose information collecting apparatus, thereby increasing cost. Alternatively, it is possible to provide a facsimile machine in the LAN with the information collecting and managing function instead of the special-purpose information collecting apparatus. However, there is a problem in that functions of the facsimile machine cannot be performed, like in the system (2).

(4) A system in which an image formation apparatus sends an E-mail including management information concerning the image formation apparatus to a managing apparatus, thereby enabling managing and checking of the image formation apparatus from a remote location, is proposed in U.S. Pat. No. 5,909,493. It is unnecessary to add a telephone line and thus cost thereof does not increase. However, it is necessary to provide each image formation apparatus that is to be managed with an E-mail address, and to request the Internet service provider (ISP) to provide an E-mail address. Further, as E-mails are generally sent through a mail server, the information does not reach the managing apparatus immediately in some cases. Therefore, there is a problem that in case of an emergency notice, such as occurrence of an abnormal condition, whether the notice has reached the managing apparatus cannot be confirmed, and eventually, it becomes necessary to contact the managing apparatus by telephone.

SUMMARY OF THE INVENTION

It is an object of the invention to at least solve the problems in the conventional technology.

An image processing apparatus management system according to an aspect of the present invention includes a managing apparatus connected to a computer network; and an image processing apparatus that is connected to the computer network and managed by the managing apparatus via the computer network, wherein the image processing apparatus is connected to the computer network via a firewall that allows data transmitted using predetermined protocols to pass through, wherein at least one of the predetermined protocols has an immediacy, and the image processing apparatus having a report generating/transmitting unit that generates report data and transmits the report data to the managing apparatus through the computer network using the protocol having the immediacy.

An image processing apparatus according to another aspect of the present invention is connected to a computer network via a firewall that allows data transmitted using predetermined protocols to pass through, wherein at least one of the predetermined protocols has an immediacy, wherein a managing apparatus connected to the computer network manages a predetermined image processing apparatus. The image processing apparatus includes a report generating/transmitting unit that generates report data and transmits the report data to the managing apparatus through the computer network using the protocol having the immediacy.

A method according to still another aspect of the present invention is a method in which a managing apparatus manages an image processing apparatus, the managing apparatus and the image processing apparatus being connected via a computer network, and the image processing apparatus being connected to the computer network via a firewall that allows data transmitted using predetermined protocols to pass through, wherein at least one of the predetermined protocols has an immediacy, comprising the managing apparatus receiving report data from the image processing apparatus sent through the computer network using the protocol having the immediacy, wherein the report data includes information about the image processing apparatus; the managing apparatus outputting contents of the report data received; and the managing apparatus sending a reply data to the image processing apparatus, in response to the report data received.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 5 illustrates an example of data sent from the multifunction peripheral to the management server when an amount of unused toner is equal to or less than a predetermined value;

FIG. 6 illustrates an example of reply data sent from the management server to the multifunction peripheral in response to the data about the amount of unused toner;

FIG. 7 illustrates an example of data sent from the multifunction peripheral to the management server when a part in the multifunction peripheral needs to be replaced;

FIG. 8 illustrates an example of reply data sent from the management server to the multifunction peripheral in response to the data about the part to be replaced;

FIG. 9 illustrates an example of data sent from the multifunction peripheral to the management server when an abnormal condition occurs in the multifunction peripheral;

FIG. 10 illustrates an example of reply data sent from the management server to the multifunction peripheral in response to the data about the abnormal condition;

FIG. 11 illustrates an example of data sent from the multifunction peripheral to the management server when a user sends information;

FIG. 12 illustrates an example of reply data sent from the management server to the multifunction peripheral in response to the data sent by the user;

FIG. 13 illustrates an example of data sent from the multifunction peripheral to the management server when a user orders consumable products or parts to be replaced;

FIG. 14 illustrates an example of reply data sent from the management server to the multifunction peripheral in response to the user's order;

FIG. 15 illustrates an example of data sent from the multifunction peripheral to the management server to request an update of a predetermined program;

FIG. 16 illustrates an example of reply data sent from the management server to the multifunction peripheral in response to the request for updating the predetermined program;

FIG. 17 illustrates an example of data sent from the multifunction peripheral to the management server to inform the management server of a predetermined utilization state; and FIG. 18 illustrates an example of reply data sent from the management server to the multifunction peripheral in response to the data about the predetermined utilization state.

DETAILED DESCRIPTION

Exemplary embodiments of an image processing apparatus, an image processing apparatus management system, and a method of managing the image processing apparatus according to the present invention will be explained in detail with reference to the accompanying drawings.

Figure 1:
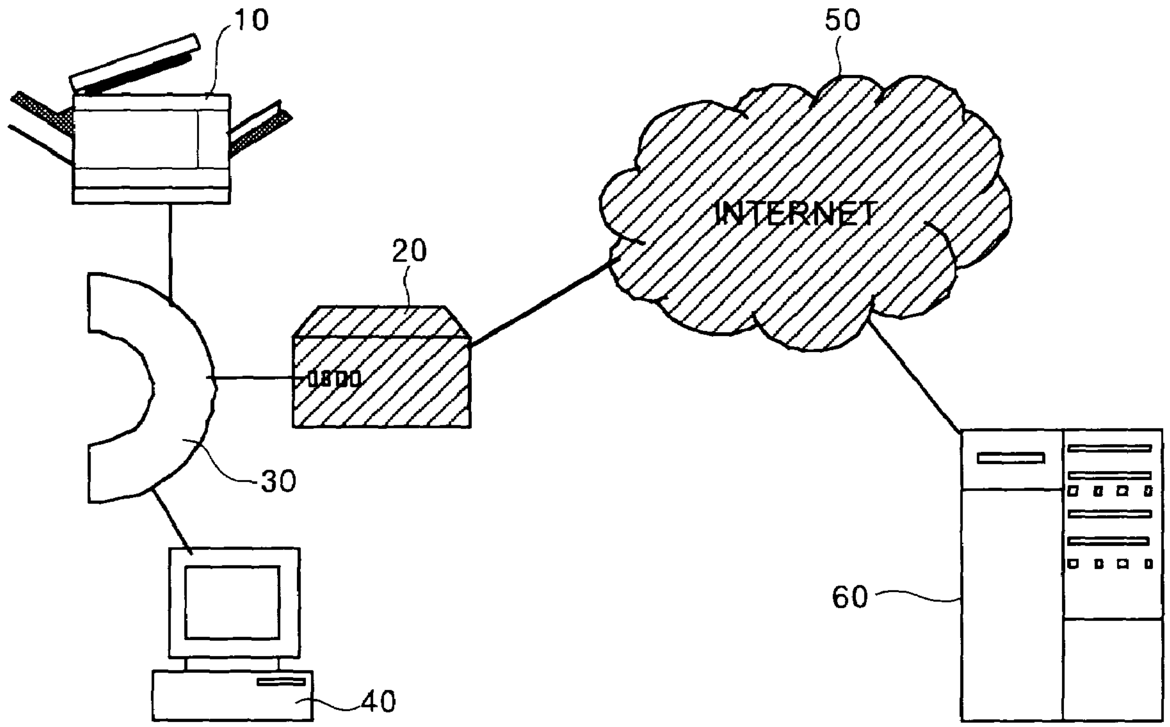
FIG. 1 is a block diagram of a network system to which an image processing apparatus management method according to an embodiment of the present invention is applied.

FIG. 1 is a block diagram of a network system to which an image processing apparatus management method according to an embodiment of the present invention is applied. The network system includes a multifunction peripheral 10, a firewall 20, a LAN 30, personal computer (PC) 40, and a management server 60 that is connected to the Internet 50.

The PC 40 and the multifunction peripheral 10 are connected to the LAN can connect to the Internet 50 through the firewall 20. With this configuration, data can be sent and received between the PC 40, the multifunction peripheral 10, the management server 60 and other Web servers (not shown).

The PC 40 can execute a network printer function in which the PC 40 sends data to the multifunction peripheral 10 through the LAN 30, and the multifunction peripheral 10 prints an image of the data.

The firewall 20 is disposed between the LAN 30 and the Internet 50. Data communication between apparatuses connected to the LAN 30, and other apparatuses connected to the Internet 50 is carried out through the firewall 20. The firewall 20 analyses a packet of data against a set of filters. Packets that satisfy the conditions make it through the firewall, and others are discarded, thereby preventing a third party from entering into the LAN 30 out of malice.

The firewall 20 provides control by permitting communication using predetermined protocols, and blocks communication using protocols other than the preset protocols. Thus, the firewall 20 prohibits an external apparatus from accessing the multifunction peripheral 10, but allows reply data sent by the management server 60 to reach the complex apparatus.

In this embodiment, the firewall 20 allows data communication using hypertext transfer protocol (HTTP) protocol and simple mail transfer protocol (SMTP) protocol. Thus, an apparatus connected to the LAN 30 such as the PC 40, can browse Internet websites and send and receive E-mails.

The multifunction peripheral 10 realizes a plurality of image processing functions such as copying, printing, scanning and a facsimile function.

Figure 2:
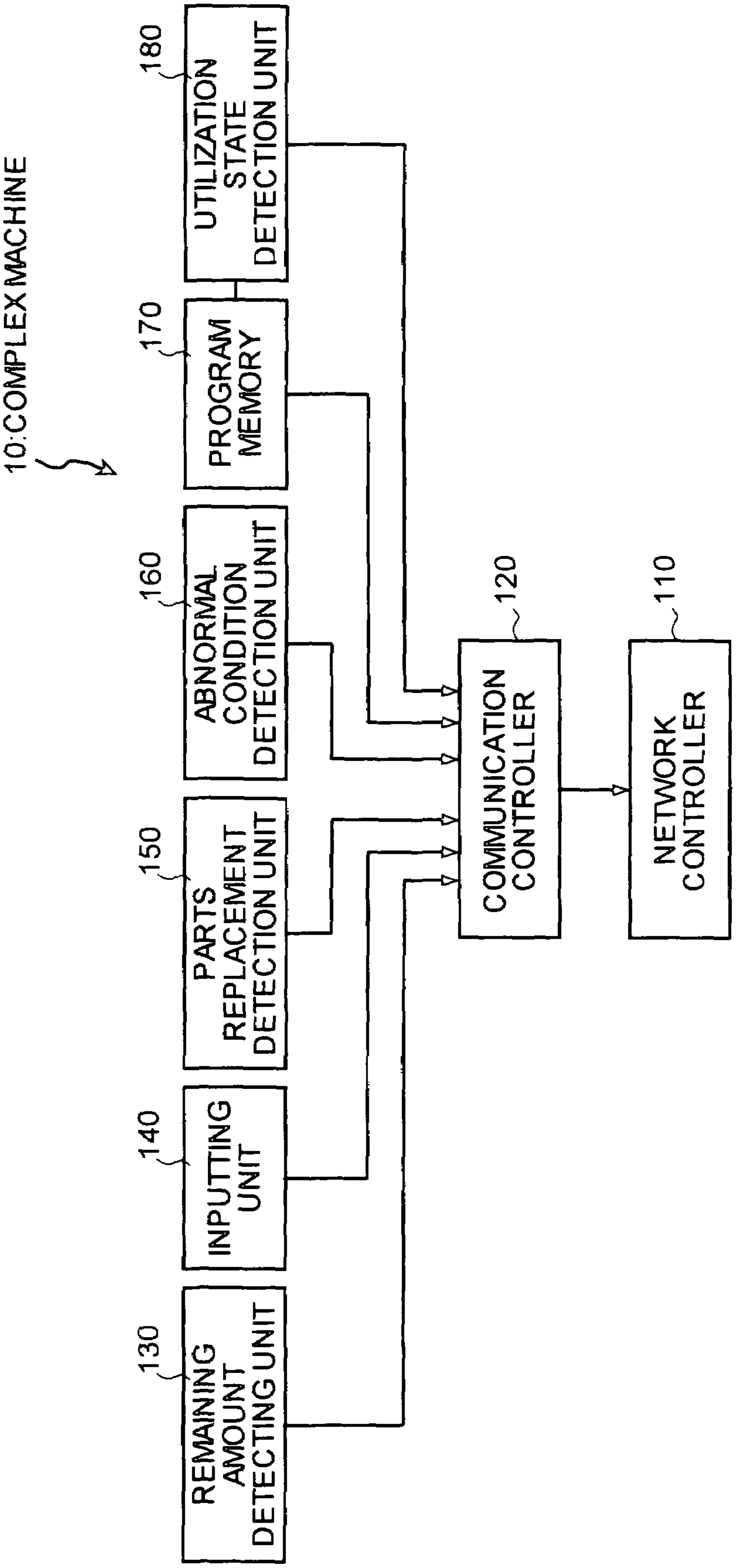
FIG. 2 is a functional block diagram of a multifunction peripheral in the network system.

FIG. 2 is a functional block diagram of a multifunction peripheral in the network system. The multifunction peripheral 10 includes structures (not shown in the figure) for realizing various functions. For example, a photosensitive drum and a developing apparatus of an electronic photographic system for image formation, a paper feeding mechanism for feeding sheets of paper, and a paper feeding unit for accommodating and feeding the sheets. The multifunction peripheral also includes a network controller 110, a communication controller 120, a remaining amount detecting unit 130, an inputting unit 140, a parts replacement detection unit 150, an abnormal condition detection unit 160, a program memory 170 and a utilization state detection unit 180.

The network controller 110 carries out data communication with a Web server connected to the Internet 50 through the firewall 20.

A toner for forming an image is one of the consumable products used in the multifunction peripheral 10. The remaining amount detecting unit 130 detects an amount of unused toner and sends the result to the communication controller 120. The remaining amount detecting unit 130 includes a magnetic escaping ratio sensor that detects an amount of unused toner remaining in a toner bottle, based on a density of the toner. The method of detecting the amount of unused toner is not limited to this method, and other methods can be used. Instead of detecting the amount of unused toner, an amount of toner used may be estimated from the number of sheets output, and the remaining amount may be calculated from the amount of toner used.

In this embodiment, the remaining amount detecting unit 130 detects the amount of unused toner in the multifunction peripheral 10. Alternatively, the remaining amount detecting unit 130 may detect usage of other consumable products, such as the number of sheets of paper accommodated in a paper feed tray, and send the result to the communication controller 120.

The inputting unit 140 includes an input device such as a numeric keypad, a switch and a graphical user interface (GUI), and sends information or commands corresponding to the operating instructions input by a user to the communication controller 120.

The parts replacement detection unit 150 detects whether there is a part in the multifunction peripheral 10 that needs to be replaced, and sends the information about the part to be replaced, to the communication controller 120. In this embodiment, the parts replacement detection unit 150 determines that the toner bottle needs to be replaced if the remaining amount of toner becomes equal to or less than a predetermined value, and sends this information to the communication controller 120. The parts replacement detection unit 150 may determine the need of replacing a part other than the toner bottle.

The abnormal condition detection unit 160 detects an occurrence or possibility of occurrence of an abnormal condition in the multifunction peripheral 10. If the abnormal condition detection unit 160 detects the occurrence of an abnormal condition or that the possibility of occurrence of the abnormal condition is high, the abnormal condition detection unit 160 informs the communication controller 120 of the condition detected. The abnormal condition detection unit 160 may be provided with an appropriate detection unit. For instance, the detection unit may count the frequency of paper-jamming within a constant period, and check whether the number exceeds a predetermined value, or may determine that there is a possibility of an abnormal condition in the paper feeding mechanism, or may detect failure in the photosensitive drum.

Various programs that are executed by a central processing unit (CPU) in the multifunction peripheral 10 are stored in the program memory 170. By executing these programs, functions such as the printer function and the copy function are realized. In this multifunction peripheral 10, the program can be updated, or a new program can be added. A new program supplied from the communication controller 120 is stored in the program memory 170.

The utilization state detection unit 180 detects utilization states of the various functions of the multifunction peripheral 10. In this embodiment, the number of sheets of paper output, such as color image output and monochrome image output is counted, and the utilization state detection unit 180 outputs the number when requested by the communication controller 120.

During a predefined state, the communication controller 120 generates data having contents corresponding to that state, and sends the data to the management server 60 through the network controller 110, the firewall 20 and the Internet 50. Procedure concerning data communication control carried out in each state will be described later.

The communication controller 120 of this embodiment controls the data communication using HTTP protocol, which is a protocol having immediacy. Thus, it is possible to access the management server 60 through the Internet 50 and data can be sent to the management server 60 without being blocked by the firewall 20.

Here, the protocol having immediacy is a protocol that can directly access a web server etc. for example, by internet browsing using HTTP protocol. In other words, a protocol that can communicate with the target apparatus immediately is used. Any other protocols permitted by the firewall 20 may also be used. SMTP that is a protocol for sending and receiving E-mails is not the protocol having immediacy in nature.

Referring back to FIG. 1, the management server 60 is set up by an enterprise that carries out management service of the image processing apparatus such as the multifunction peripheral 10, and includes a single of a plurality of personal computers or workstations that can communicate with each other. By executing a program stored in an external memory such as a hard disk drive, the management server 60 realizes a function for managing the image processing apparatus.

Figure 3:
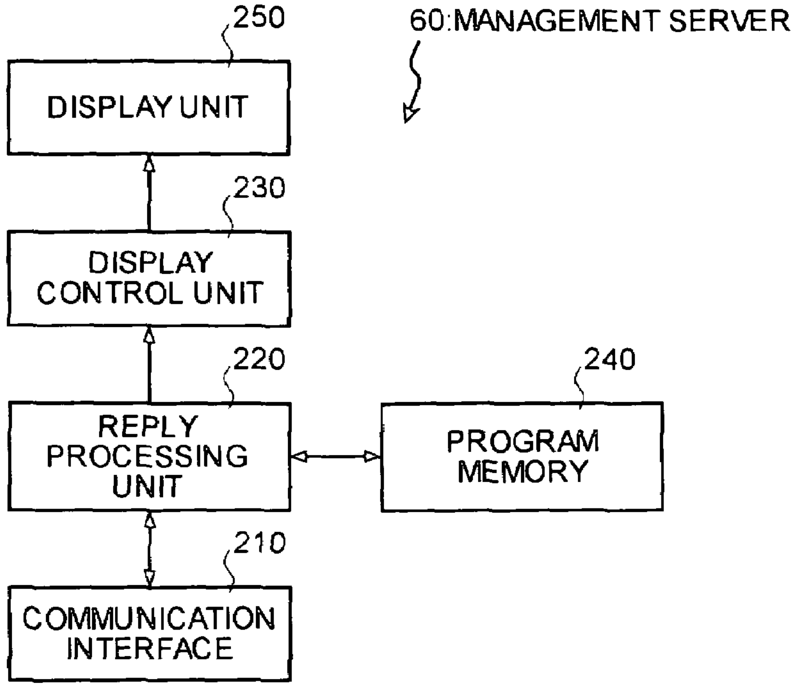
FIG. 3 is a functional block diagram of a management server in the network system.

FIG. 3 is a functional block diagram of a management server in the network system. The management server 60 includes a communication interface 210, a reply processing unit 220, a display control unit 230, a program memory 240 and a display unit 250.

The communication interface 210 sends and receives data to and from the communication apparatus such as the PC 40 and the multifunction peripheral 10 through the Internet 50. When the multifunction peripheral 10 sends data through the Internet 50 to the management server 60, the reply processing unit 220 sends, to the multifunction peripheral 10, reply data in response to the data received or, if necessary, data including the program stored in the program memory 240. Details of this process will be described later.

The display control unit 230 makes the display unit 250, which may be a liquid crystal display (LCD), display contents of the data received from the multifunction peripheral 10. The program memory 240 stores an update program or new program that is to be sent to the multifunction peripheral 10 or another image processing apparatus. These programs are developed for managing the image processing apparatus. An operator of the management server 60 inputs these programs that are then stored in the program memory 240.

Figure 4:
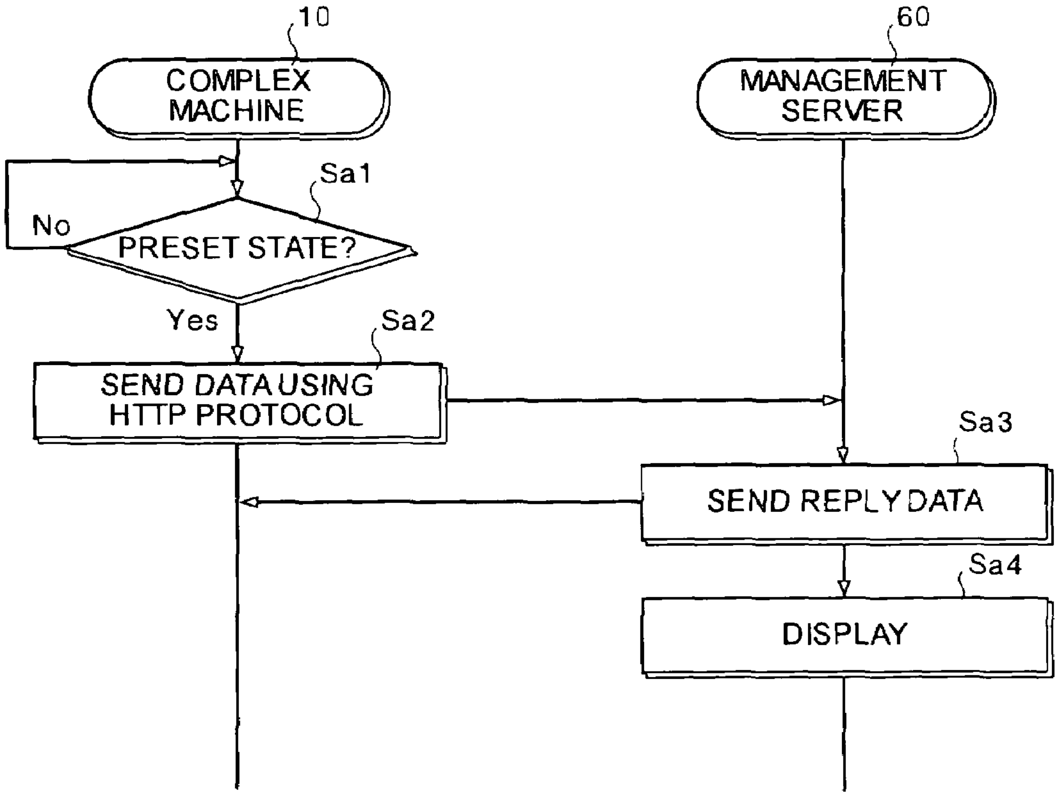
FIG. 4 is a flowchart of an operation of the multifunction peripheral and the management server.

FIG. 4 is a flowchart of an operation of the multifunction peripheral and the management server in the network system. When the power of the multifunction peripheral 10 is turned on, the communication controller 120 of the multifunction peripheral 10 determines whether the multifunction peripheral is in a preset state (step Sa1). If the multifunction peripheral is in the preset state, the communication controller 120 accesses the management server 60 via the Internet 50. For example, if the address of the management server 60 is "www.remote.service.xxxxx.co.jp", the communication controller 120 uses this address to access the management server 60 via the Internet 50. The communication controller 120 sends data corresponding to the state of the multifunction peripheral 10, to the management server 60 using HTTP protocol (step Sa2). As the firewall 20 permits communication using HTTP protocol, the data can be sent to the management server 60.

On receiving the data from the multifunction peripheral 10, the reply processing unit 220 of the management server 60 prepares reply data to acknowledge the receipt of the data, and sends the reply data to the multifunction peripheral 10 via the Internet 50 (step Sa3). The firewall 20 permits reply data sent by the management server to pass through and reach the multifunction peripheral 10. If the reply data is displayed on the display panel of the multifunction peripheral 10, a user of the multifunction peripheral 10 can confirm that the data concerning the multifunction peripheral 10 reached the management server 60, and it is unnecessary to confirm this situation by telephone.

The display control unit 230 of the management server 60 displays the contents of the received data on the display unit 250 (step Sa4). Consequently, the operator is informed of the contents of the data received.

The preset state that triggers the start of sending operation of data by the multifunction peripheral 10, and detail operation carried out in this state will be explained separately.

The multifunction peripheral 10 in this embodiment sends data to the management server 60 in the event of the following states:

1) When the remaining amount detecting unit 130 detects that a value of the amount of unused consumable product is equal to or less than a predetermined value, 2) When the parts replacement detection unit 150 detects that a part needs to be replaced, 3) When the abnormal condition detection unit 160 detects an occurrence or possibility of occurrence of an abnormal condition in the multifunction peripheral, 4) When a user sends information to the management server, 5) When a user orders consumable products or parts to be replaced, 6) When the update request to update a predetermined program is sent at a predetermined timing, and 7) When the management server should be informed of a predetermined utilization state.

In any of the above state, the communication controller 120 in the multifunction peripheral 10 generates data having contents corresponding to that state and controls the network controller 110 to send the data to the management server 60. Each of the above seven states are explained in detail below.

1) When the remaining amount detecting unit 130 detects that a value of the amount of unused consumable product less than or equal to a predetermined value.

The communication controller 120 determines whether the amount of unused consumable product detected by the remaining amount detecting unit 130 is equal to or lower than the predetermined value.

If the remaining amount value is equal to or lower than the predetermined value, the communication controller 120 generates data having a format that conforms to the HTTP protocol as shown in FIG. 5 and sends the data to the management server 60 through the Internet 50. In the data shown in FIG. 5, "/cgi-bin/cgi.remoteservice" is a function realized by a program executed by the management server 60, and indicates the sending with respect to this program. The argument "U=123456" is a registration number of the sender machine and is necessary to identify the image processing apparatus (multifunction peripheral 10). The argument "P=341" is an error number and in this case, indicates that the amount of unused toner is equal to or less than a predetermined value. The registration number and error number are included in the data sent to the management server 60.

The reply processing unit 220 of the management server 60, generates reply data as shown in FIG. 6, and sends the data to the multifunction peripheral 10 through the Internet 50. In the data shown in FIG. 6, the first three lines are data having format that conforms to the HTTP protocol, and after the fourth line, information such as time of reception, type of contents, reception number, and a description "toner end" are included.

The display control unit 230 of the management server 60 refers to a registration number table. A registration number table stores in correlated form, a machine registration number and model, installation place, installing person, cover address of the installing person. Then, the display control unit 230 determines from the machine registration number included in the received data, which installing person has the image processing apparatus. The display control unit 230 refers to an error content table in which the error number and the error contents are associated with each other, and obtains the error contents corresponding to the error number included in the data received.

The display control unit 230 makes the display unit 250 display error contents and error information concerning the image processing apparatus. In this case, the installation place of the multifunction peripheral 10, the installing person, the cover address and the error that the remaining amount of toner is less are displayed. Thus, an operator who sees this information can inform the installing person of the multifunction peripheral 10 of the fact that the remaining amount of toner is less by telephone or E-mail, or can order the toner bottle.

Alternatively, when the reply processing unit 220 receives data from the multifunction peripheral 10, showing that the amount of unused toner is less, an E-mail or facsimile including this information may be sent automatically to the installing person of the multifunction peripheral 10.

2) When the parts replacement detection unit 150 detects that a part needs to be replaced.

When the communication controller 120 receives from the parts replacement detection unit 150, an indication that the toner bottle should be replaced, the communication controller 120 generates data having format that conforms to the HTTP protocol as shown in FIG. 7 and transmits this information to the management server 60 through the Internet 50.

The data shown in FIG. 7 is different from the data shown in FIG. 5 in that the error number "P" has a value "531". The error number 531 indicates that the toner bottle should be replaced.

The reply processing unit 220 of the management server 60 generates reply data as shown in FIG. 8, and sends the reply data to the multifunction peripheral 10 through the Internet 50. In the data shown in FIG. 8, the first three lines are data having format that conform to the HTTP protocol, and after the fourth line, information such as time of reception, type of contents, reception number, and a description "toner bottle should be replaced" are included.

The display control unit 230 of the management server 60 refers to the registration number table and the error content table like the above case, to thereby obtain the error contents and error information concerning the image processing apparatus, and makes the display unit 250 display the information. In this case, the installation place and the installing person of the multifunction peripheral 10, the cover address and the error that the toner bottle should be replaced are displayed. Thus, an operator who sees this information can inform the installing person of the multifunction peripheral 10 of the fact that the remaining amount of toner is less by telephone or E-mail, or can order the toner bottle, or can request a serviceman to replace the toner bottle.

3) When the abnormal condition detection unit 160 detects an occurrence or possibility of occurrence of an abnormal condition.

When the communication controller 120 receives from the abnormal condition detection unit 160, an indication that an abnormal condition has occurred or the possibility that the abnormal condition has occurred is high, the communication controller 120 generates data having format that conforms to the HTTP protocol as shown in FIG. 9 and transmits this information to the management server 60 through the Internet 50.

The data shown in FIG. 9 is different from the data shown in FIG. 5 in that the error number "P" has a value "784". The error number 784 indicates that abnormal condition occurred in a fixing drum.

The reply processing unit 220 of the management server 60 generates reply data as shown in FIG. 10, and sends the reply data to the multifunction peripheral 10 through the Internet 50. In the data shown in FIG. 10, the first three lines are data having format that conforms to the HTTP protocol, and after the fourth line, information such as time of reception, type of contents, reception number, and a description "abnormal condition in fixing drum" are included.

The display control unit 230 of the management server 60 refers to the registration number table and the error content table like the above case, to thereby obtain the error contents and error information concerning the image processing apparatus, and makes the display unit 250 display the information. In this case, the model name, the installation place and the installing person of the multifunction peripheral 10, the cover address and the error that the abnormal condition occurred in the fixing drum are displayed. Thus, an operator who sees this information can inform the installing person of the multifunction peripheral 10 of an occurrence of an abnormal condition in the fixing drum by telephone or E-mail, or can order the drum, or can request a serviceman to replace the fixing drum.

4) When a user sends information.

When a user inputs through the inputting unit 140, information such as a problem concerning the image processing apparatus, and instructs to send the information to the management server 60, the communication controller 120 generates data having format that conforms to the HTTP protocol as shown in FIG. 11 and transmits this information to the management server 60 through the Internet 50.

The data shown in FIG. 11 is different from the data shown in FIG. 5 in that an argument "T" showing the contents input by the user is used instead of "P", and "T" represents many scummings.

The reply processing unit 220 of the management server 60 generates reply data as shown in FIG. 12, and sends the reply data to the multifunction peripheral 10 through the Internet 50. In the data shown in FIG. 12, the first three lines are data having format that conforms to the HTTP protocol, and after the fourth line, information such as time of reception, type of contents, reception number, and a description "scumming" are included.

The display control unit 230 of the management server 60 refers to the registration number table like the above case, to thereby obtain the contents inputted by the user and the information sent by the user concerning the image processing apparatus, and makes the display unit 250 display this information and the user input information. In this case, the model name, the installation place and the installing person of the multifunction peripheral 10, the cover address and the "scumming" inputted by the user are displayed. Thus, an operator who sees this information can inform a serviceman of the situation, and the serviceman can provide a suitable solution.

When a user inputs arbitrary contents in this manner, it is possible to inform the management server 60 of the contents. Therefore, even when a problem, other than one that can be detected automatically occurs, it is possible to inform the management server 60 of this problem. As a result, various problems can be handled.

5) When a user orders consumable products or parts to be replaced.

When a user orders consumable products or replacement of a part of the image processing apparatus through the inputting unit 140 and instructs to send the information to the management server 60, the communication controller 120 generates data having format that conforms to the HTTP protocol as shown in FIG. 13 and transmits this information to the management server 60 through the Internet 50.

The data shown in FIG. 13 is different from the data shown in FIG. 5 in that an argument "E=Type2&U=2" showing the order information inputted by the user is used instead of "P", and "U=2" means that the number of parts ordered is two.

The reply processing unit 220 of the management server 60 generates reply data as shown in FIG. 14, and sends the reply data to the multifunction peripheral 10 through the Internet 50. In the data shown in FIG. 14, the first three lines are data having format that conforms to the HTTP protocol, and after the fourth line, information such as time of reception, type of contents, reception number, and a description "Type2 toner two" are included.

The display control unit 230 of the management server 60 refers to the registration number table like the above case, to thereby obtain the contents inputted by the user and information concerning the image processing apparatus. Further, the display control unit 230 refers to an order content table in which order information such as "Type2" and name of ordered part are associated with each other, to thereby obtain the name of ordered part from the order information included in the received data.

The display control unit 230 makes the display unit 250 display the information. In this case, a model name, an installation place, an installing person and a cover address of the multifunction peripheral 10 and the description "two bottles of toner" ordered by the user are displayed. Thus, an operator who sees this information can order and send two bottles of toner. Alternatively, an order processing unit that orders the parts automatically when data shown in FIG. 13 is received, may be provided.

6) When the update request to update a predetermined program is sent at a predetermined timing.

If it is time for updating a predetermined program according to a predetermined schedule (e.g., 10:00 AM on Monday, or at a power turn-on), the communication controller 120 generates data having format that conforms to the HTTP protocol as shown in FIG. 15 and transmits this information to the management server 60 through the Internet 50.

The data shown in FIG. 15 is different from the data shown in FIG. 5 in that a party to which information or data should be sent is a program "/cgi-bin/cgi.checkupdate" which carries out the updating processing. This program confirms whether a program is to be updated, and if there is such a program, the program realizes a function to send the program. In this embodiment, the reply processing unit 220 realizes this function.

The reply processing unit 220 of the management server 60 confirms whether there exists a program to be updated by referring to an update-history database that contains history of updates of a large number of image processing apparatuses that are to be managed.

That is, when this data is received, the reply processing unit 220 refers to the update-history database, to determine the latest updated program of the image processing apparatus. If a program corresponding to the model of the image processing apparatus after the latest updated program is stored in the program memory 240, the reply processing unit 220 determines that it is necessary to update the program. If a new program is not stored in the program memory, the reply processing unit 220 determines that it is not necessary to update the program.

If updating the program is necessary, the reply processing unit 220 generates reply data as shown in FIG. 16, and sends the data to the multifunction peripheral 10 through the Internet 50. In the data shown in FIG. 16, the first three lines are data having format that conforms to the HTTP protocol, and after the fourth line, information such as time of reception, type of contents, reception number, and a description "controller update" are included.

In addition, the new update program that is read from the program memory 240 is included in a portion of the reply data separated by "Next Part". The reply processing unit 220 generates reply data including such an update program, and sends the data to the multifunction peripheral 10 through the Internet 50. By including the program in the reply data, it is possible to send the program to the multifunction peripheral 10 without being discarded by the firewall 20.

When the reply processing unit 220 sends the update program, the sending time and identification information of the program sent are registered in the update-history database. Registering the information in the update-history database is useful at the time of subsequent updates to the program of the image processing apparatus.

7) When the management server is informed of a predetermined utilization state, at a predetermined timing.

If it is time to inform the management server 60 of a utilization state of the multifunction peripheral 10 (e.g., 10:00 AM on Monday, or 6:00 PM on month-end day), the communication controller 120 generates data having format that conforms to the HTTP protocol as shown in FIG. 18 and transmits this information to the management server 60 through the Internet 50.

The data shown in FIG. 18 is different from the data shown in FIG. 5 in that arguments "TC", "BC", and "CC" are included instead of the error number "P". "TC", "BC" and "CC" respectively mean the total number of images output (TC), the number of monochrome images output (BC) and the number of color images output (CC). In FIG. 17, "TC=46456" means that the total number of images output is 46456, "BC=34842" means that the number of monochrome images output is 34842, and "CC=11614" means that the number of color images output is 11614. The communication controller 120 generates data including the number of sheets output based on a value of a counter, which counts the number of sheets, supplied by the utilization state detection unit 180.

The reply processing unit 220 of the management server 60 generates reply data as shown in FIG. 18, and sends the data to the multifunction peripheral 10 through the Internet 50. In the data shown in FIG. 18, the first three lines are data having format that conforms to the HTTP protocol, and after the fourth line, information such as time of reception, type of contents, reception number, and a description of number of sheets output, is included.

The reply processing unit 220 stores the number of sheets output in correlation with the multifunction peripheral that sends this data. Therefore, the management serviceperson or service company can charge an installing person of the multifunction peripheral 10 for the number of images output, based on the registered billing information. Thus, a serviceperson is saved the trouble of going to the installation place of the image processing apparatus to record the number of images output.

According to this embodiment, the management server 60 at a remote location can administer an image processing apparatus, such as the multifunction peripheral 10, without the need of a serviceperson to visit the image processing apparatus. More specifically, the management server 60 can check the amount of consumable products remaining, and determine whether a part should be replaced, whether an abnormal condition occurs, and whether a program should be updated. The management server 60 is informed of a result that is detected objectively by a specific unit such as the remaining amount detecting unit 130 of the multifunction peripheral 10. Therefore, it is possible, in many cases, to comprehend the state of the multifunction peripheral 10 more precisely as compared with a case in which a user describes an abnormal condition by telephone. Consequently, it is possible to handle such problem more appropriately.

If the connectivity with the Internet 50 is already established, that is, if the multifunction peripheral 10 is connected to the LAN 30, it is not necessary to increase a telephone line to manage the image processing apparatus at a remote location, and it is not necessary to install a special-purpose intermediate management server in the LAN 30. Consequently, it is possible to reduce the additional cost and the complexity when the management system is introduced.

Instead of data communication utilizing dialup lines between the management server 60 and the multifunction peripheral 10, a computer network such as the Internet 50, which does not require the line at the time of the data communication, is utilized. If the multifunction peripheral 10 is located in an office, the multifunction peripheral 10 may not be able to send and receive data to and from the management server 60 if a telephone line is busy, or if other PC or facsimile machine cannot communicate with the management server 60. Thus, introduction of the system in the network avoids such problems and, at the same time, does not affect execution of any other operation.

If the image processing apparatus sends an indication of occurrence of an abnormal condition to the management server by E-mail, a problem that a line is busy does not occur. However, when data is sent by E-mail, a mail server is interposed in many cases. Further, an immediate response may not be sent in some cases. Thus, when an emergency abnormal condition occurs, the problem cannot be attended to immediately. Furthermore, in this method, it is necessary to obtain a new E-mail address for the management, and a troublesome procedure such as requesting a service provider of the Internet to issue the address is also required.

However, the multifunction peripheral 10 of this embodiment carries out the communication using the HTTP protocol having the immediacy in nature. Thus, it is possible to communicate with the management server 60 immediately by connecting with the Internet 50, designating the address of the management server 60 and sending data to describe the condition of the multifunction peripheral 10. Consequently, even if abnormal condition that needs to be handled immediately occurs, after the abnormal condition detection unit 160 detects the abnormal condition, the information sent from the multifunction peripheral 10 reaches the management server 60 immediately. Therefore, it is possible to handle the abnormal condition swiftly and procedure for obtaining an additional E-mail address is unnecessary.

The present invention is not limited by the above embodiments, but can be modified in the ways illustrated hereafter.

In the embodiment, data is sent and received between the multifunction peripheral 10 and the management server 60 through the Internet 50. Alternatively, a computer network using telephone line, which is not occupied at the time of data communication, may be used. For example, data communication may be carried out between the multifunction peripheral 10 and the management server 60 through a radio packet communication network.

In the embodiment, the image processing apparatus to be managed by the management server 60 is the multifunction peripheral 10 having the plurality of functions such as copying, printing, scanning and facsimile. The image processing apparatus to be managed is not limited to the multifunction peripheral 10, and it may be an apparatus having a single image processing function such as copying, printing, scanning and facsimile.

In the embodiment, data is sent from the multifunction peripheral 10 to the management server 60 in any of the seven states. The data sending timing may be different from these states. For example, the communication controller 120 may send the data in which machine registered number is included but error contents are not included, at fixed intervals (e.g., every one hour) irrespective of the states.

The access from the management server 60 other than sending reply is prohibited by the firewall 20. Therefore, it is not possible to access the multifunction peripheral 10 from the management server 60 even if the management server's side has proper reasons. Therefore, even if the communication controller 120 sends the data to the management server 60 at fixed intervals as described above, it is possible to send necessary data as a reply thereto from the management server 60 to the multifunction peripheral 10.

As explained above, according to one aspect of the invention, it is possible to manage the image processing apparatus from a remote location, efficiently.

According to another aspect of the invention, the management apparatus can send data to the image processing apparatus, while at the same time, other apparatuses can not access the image processing apparatus for any other purpose.

According to still another aspect of the invention, the managing apparatus can send a program to the image processing apparatus to be managed.

According to still another aspect of the invention, using the HTTP protocol for communication suppress the increase in cost when the management system is introduced.

According to still another aspect of the invention, the management apparatus can identify the image processing apparatus that sends data and can send an appropriate reply immediately.

According to still another aspect of the invention, additional cost of a new telephone line and the trouble of obtaining an additional E-mail address for communicating with the management server can be avoided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus management system, comprising:

an image processing apparatus communicably linked to a first computer network and having a printing function;

a managing apparatus communicably linked to a second computer network and configured to manage the image processing apparatus; and a firewall configured to control data transmission between the first computer network and the second computer network, the firewall configured to allow reply data sent by the managing apparatus in the second computer network to reach the image processing apparatus in the first computer network, the reply data being in reply to report data sent to the managing apparatus from the image processing apparatus using at least one of a predetermined protocol having an immediacy, wherein the image processing apparatus has a determining unit configured to determine whether an aspect of the image processing apparatus is in at least one of a predetermined aspect, a generating unit configured to generate the report data including information concerning the image processing apparatus, when the determining unit determines that the aspect of the image processing apparatus is in the predetermined aspect, and a transmitting unit configured to transmit the report data to the managing apparatus via the firewall using the at least one of the predetermined protocol having the immediacy when the generating unit generates the report data, wherein when the managing apparatus receives the report data from the image processing apparatus, the managing apparatus is further configured to generate acknowledgement data including an indication of a reception of the report data, and to transmit the acknowledgement data including the indication of the reception of the report data as the reply data to the image processing apparatus via the firewall.

2. The image processing apparatus management system according to claim 1, wherein the firewall allows the reply data sent by the managing apparatus in response to the report data, to pass through and reach the image processing apparatus.

3. The image processing apparatus management system according to claim 2, wherein when the report data sent by the image processing apparatus includes a request for a program, the managing apparatus includes the program in the reply data.

4. The image processing apparatus management system according to claim 1, wherein the protocol having the immediacy is hypertext transfer protocol (HTTP).

5. The image processing apparatus management system according to claim 1, wherein the managing apparatus includes an informing unit configured to inform an operator of contents of the report data and an identification of the image processing apparatus that sent the report data.

6. The image processing apparatus management system according to claim 1, wherein the managing apparatus includes a report outputting unit configured to output contents of the report data and an identification of the image processing apparatus that sent the report data.

7. An image processing apparatus configured to perform an imaging function and communicably linked to a computer network via a firewall that allows data transmitted using predetermined protocols to pass through, wherein at least one of the predetermined protocols has an immediacy, wherein a managing apparatus communicably linked to the computer network manages a predetermined image processing apparatus, the image processing apparatus comprising:

a determining unit configured to determine whether an aspect of the image processing apparatus is in at least one of a predetermined aspect;

a generating unit configured to generate report data when the determining unit determines the aspect of the image processing apparatus is in the at least one of the predetermined aspect; and a transmitting unit configured to transmit the report data to the managing apparatus via the firewall using the at least one of the predetermined protocols having the immediacy when the generating unit generates the report data, wherein reply data sent by the managing apparatus to reach the image processing apparatus is sent through the firewall, the reply data is a reply to the report data sent to the managing apparatus from the image processing apparatus using the at least one of the predetermined protocols having the immediacy, wherein when the managing apparatus receives the report data from the image processing apparatus, the managing apparatus is further configured to generate acknowledgement data including an indication of a reception of the report data, and to transmit the acknowledgement data including the indication of the reception of the report data as the reply data to the image processing apparatus via the firewall.

8. The image processing apparatus according to claim 7, further comprising:

a remaining amount detecting unit configured to detect an amount of unused consumable product in the image processing apparatus, wherein when the amount detected is equal to or less than a predetermined value, the generating unit is further configured to generate the report data by including therein information about the consumable product.

9. The image processing apparatus according to claim 7, further comprising:

a product replacement detecting unit configured to detect whether a product in the image processing apparatus must be replaced, wherein when the product replacement detecting unit detects that the product must be replaced, the generating unit is further configured to generate the report data by including therein information about the product to be replaced.

10. The image processing apparatus according to claim 7, further comprising:

an abnormal condition detecting unit configured to detect at least one of an occurrence and a possibility of an occurrence of an abnormal condition in the image processing apparatus, wherein when the at least one of the occurrence and the possibility of the occurrence of the abnormal condition is detected, the generating unit is further configured to generate the report data by including therein information about the abnormal condition.

11. The image processing apparatus according to claim 7, further comprising:

an inputting unit configured to input an instruction, wherein when the instruction is input, the generating unit is further configured to generate the report data by including the instruction therein.

12. The image processing apparatus according to claim 7, further comprising:

an order information inputting unit configured to input order information to order a consumable product, wherein when the order information is input, the generating unit is further configured to generate the report data by including the order information therein.

13. The image processing apparatus according to claim 7, wherein the generating unit is further configured to generate the report data by including therein a request to send a program, and the transmitting unit is further configured to transmit the report data to the managing apparatus at a predetermined interval.

14. The image processing apparatus according to claim 7, further comprising:

a utilization state acquiring unit configured to acquire state information about a utilization state of the image processing apparatus, wherein the generating unit is further configured to generate the report data by including the state information therein, and the transmitting unit is further configured to transmit the report data to the managing apparatus at a predetermined interval.

15. The image processing apparatus according to claim 7, wherein the protocol having the immediacy is hypertext transfer protocol (HTTP).

16. A method in which a managing apparatus manages an image processing apparatus, the managing apparatus and the image processing apparatus communicably linked to a second computer network and a first computer network, respectively, and the image processing apparatus communicably linked to the managing apparatus via a firewall that allows data transmitted using predetermined protocols to pass through, wherein at least one of the predetermined protocols has an immediacy, comprising:

determining whether an aspect of the image processing apparatus is in at least one of a predetermined aspect using a determination unit in the image processing apparatus;

transmitting report data when the report data is generated, including when the aspect of the image processing apparatus is in a predetermined aspect, from the image processing apparatus to the managing apparatus via the firewall using the at least one of the predetermined protocols having the immediacy;

receiving report data from the image processing apparatus sent through the first and second computer networks and the firewall using at least one of the predetermined protocols having the immediacy at the managing apparatus;

outputting content of the report data received by the managing apparatus;

generating and sending report data from the managing apparatus to the image processing apparatus via the firewall, in response to the report data received by the image processing apparatus; and allowing the reply data sent through the firewall to reach the image processing apparatus, wherein when the managing apparatus receives the report data from the image processing apparatus, the managing apparatus is further configured to generate acknowledgement data including an indication of the reception of the report data, and to transmit the acknowledgement data including the indication of the reception of the report data as reply data to the image processing apparatus through the firewall.

17. The method according to claim 16, wherein the protocol having the immediacy is hypertext transfer protocol (HTTP).

18. The image processing apparatus management system according to claim 1, wherein the first computer network is a LAN and the second computer network is the Internet.

19. The image processing apparatus management system according to claim 1, wherein the first computer network is communicably linked to the second computer network via the firewall.

* * * * *